(12) United States Patent
Yang et al.

(10) Patent No.: US 9,110,638 B2
(45) Date of Patent: Aug. 18, 2015

(54) POINTING DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chih-Hao Yang, New Taipei (TW); Xiang-Kun Zeng, Shenzhen (CN); Rong Yang, Shenzhen (CN); Dong-Xu Tan, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 230 days.

(21) Appl. No.: 13/928,352

(22) Filed: Jun. 26, 2013

(65) Prior Publication Data
US 2014/0104768 A1 Apr. 17, 2014

(30) Foreign Application Priority Data
Oct. 15, 2012 (CN) .......................... 2012 1 0389327

(51) Int. Cl.
G06F 1/16 (2006.01)

(52) U.S. Cl.
CPC .............. G06F 1/1692 (2013.01); G06F 1/169 (2013.01)

(58) Field of Classification Search
CPC ............................. G06F 1/169; G06F 1/1692
USPC .......................................... 361/679.1, 679.18
See application file for complete search history.

(56) References Cited

U.S. PATENT DOCUMENTS

| 6,281,887 | B1 * | 8/2001 | Wang | 345/173 |
| 6,897,852 | B2 * | 5/2005 | Grosfeld et al. | 345/173 |
| 7,719,827 | B2 * | 5/2010 | Mihara et al. | 361/679.27 |
| 8,139,347 | B2 * | 3/2012 | Chiang et al. | 361/679.18 |
| 8,477,482 | B2 * | 7/2013 | Lin et al. | 361/679.01 |
| 8,693,179 | B2 * | 4/2014 | Wei | 361/679.18 |
| 2009/0147470 | A1 * | 6/2009 | Nakatani et al. | 361/679.55 |
| 2012/0314347 | A1 * | 12/2012 | Zhang | 361/679.1 |

* cited by examiner

Primary Examiner — Anthony Q Edwards
(74) Attorney, Agent, or Firm — Novak Druce Connolly Bove + Quigg LLP

(57) ABSTRACT

A pointing device includes an enclosure, a touch panel, and a securing panel. The enclosure includes an enclosure body, a first resisting portion and a second resisting portion extending from the enclosure body, and an elastic element mounted to the enclosure body. The touch panel is placed between the first resisting portion and the second resisting portion. The securing panel includes a panel body and a first resisting tab and a second resisting tab extending from the panel body. The first resisting tab is received in the first resisting portion, and the second resisting tab is received in the second resisting portion, thereby enabling the touch panel to be secured between the panel body and the enclosure body.

20 Claims, 7 Drawing Sheets

POINTING DEVICE

BACKGROUND

1. Technical Field

The present disclosure relates to a pointing device for notebook computers.

2. Description of Related Art

Notebook computers include a pointing device, such as a touchpad. The pointing device is mounted on the computer by a securing panel. However, the process of securing the securing panel is laborious and time-consuming because it is secured to a bracket by screws. Therefore, a more convenient method of mounting a pointing device is required.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
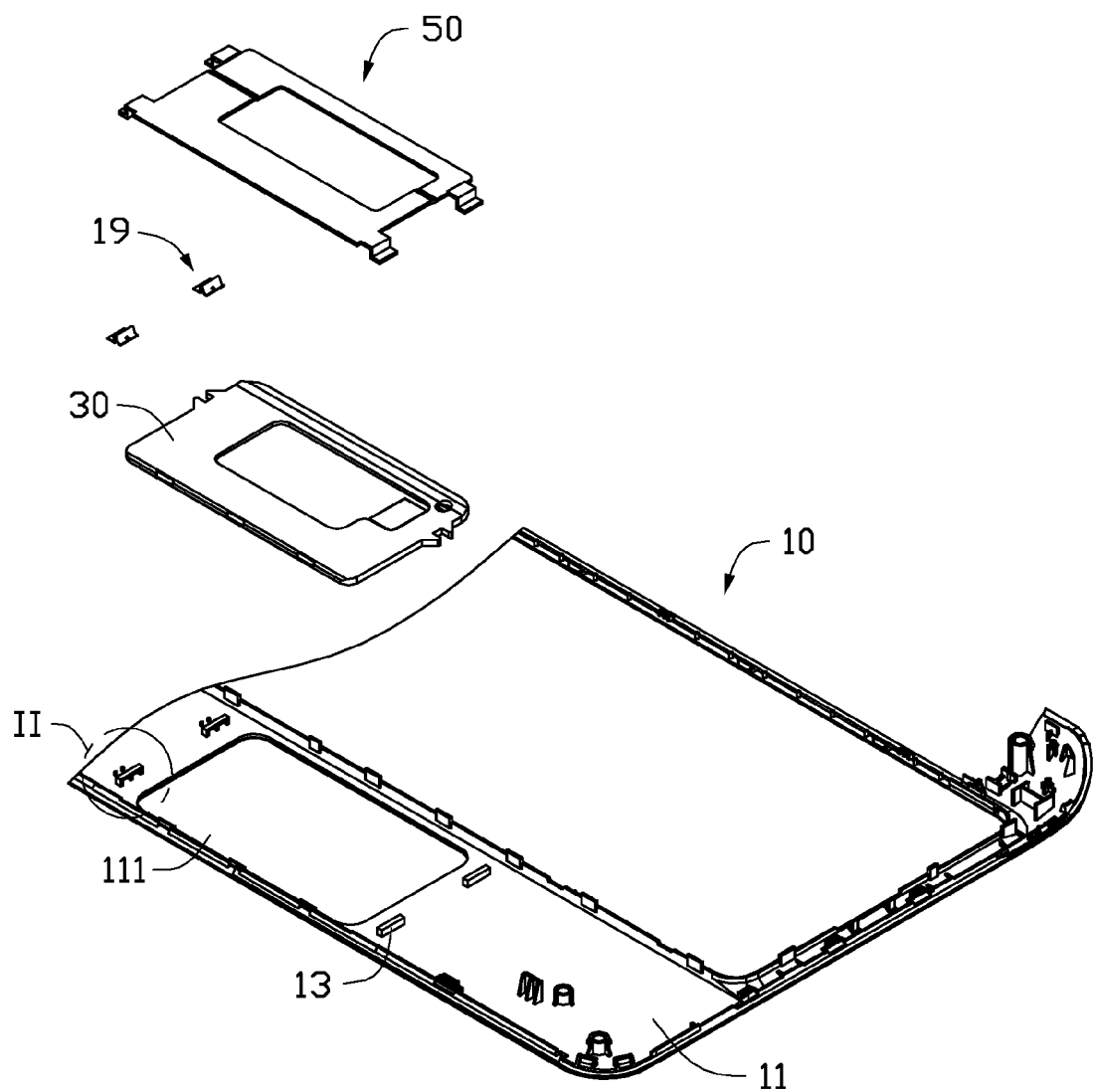
FIG. 1 is an exploded, isometric view of one embodiment of a pointing device.
Figure 2:
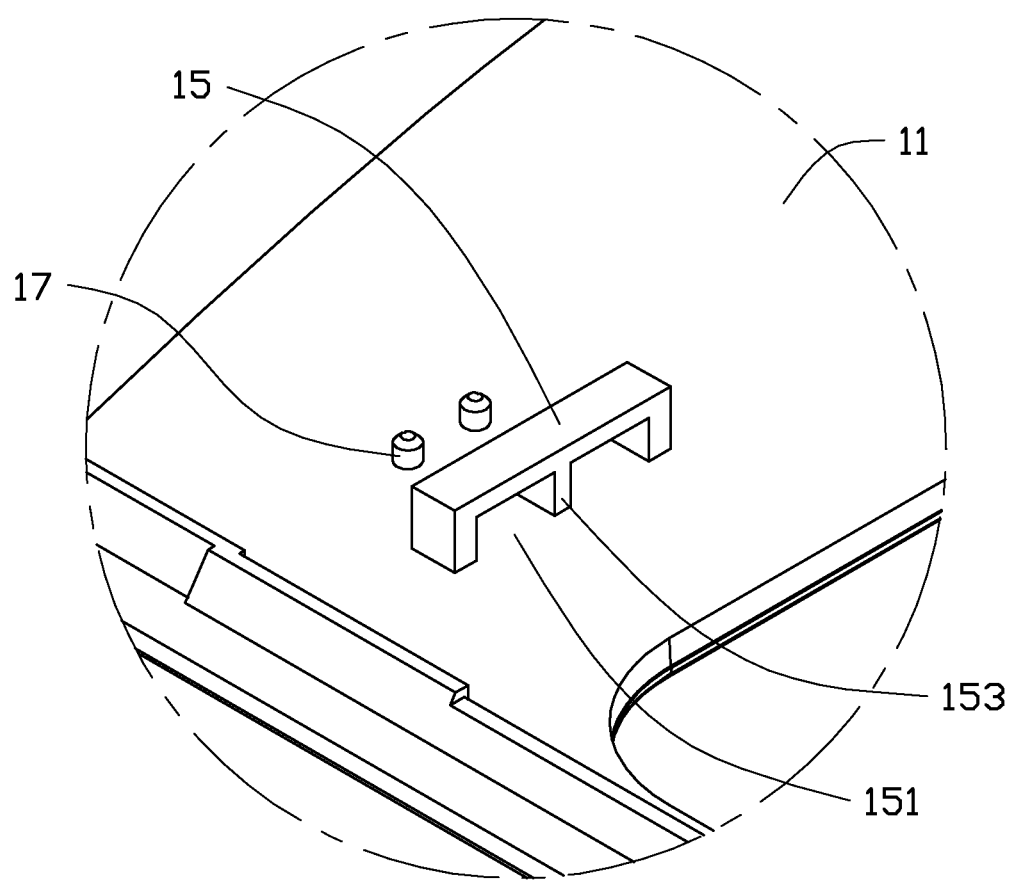
FIG. 2 is an enlarged view of the circled portion II of FIG. 1.
Figure 3:
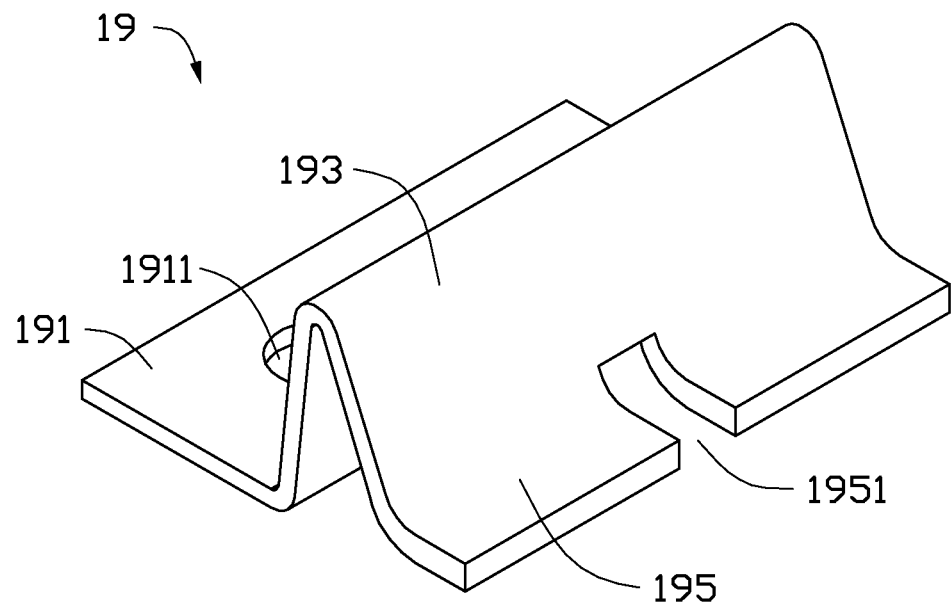
FIG. 3 is an isometric view of the elastic element of FIG. 1.

FIGS. 1 to 3 show a pointing device, according to one embodiment, including an enclosure 10, a touch panel 30, and a securing panel 50.

The enclosure 10 includes an enclosure body 11, two first resisting portions 13, and two second resisting portions 15. The two first resisting portions 13 and the two second resisting portions 15 extend from the enclosure body 11. Each first resisting portion 13 is L-shaped and includes a first part 131 (shown in FIG. 6) extending substantially perpendicularly from the enclosure body 11 and a second part 133 (shown in FIG. 6) extending substantially perpendicularly from the first part 131. The enclosure body 11 defines a mounting opening 111 corresponding to the touch panel 30. The mounting opening 111 is located between the two first resisting portions 13 and the two second resisting portions 15. Each second resisting portion 15 defines two through holes 151 and a positioning portion 153 located between the two through holes 151.

The enclosure 10 further includes two pairs of securing portions 17 extending from the enclosure body 11 and two elastic elements 19. Each elastic element 19 includes a securing part 191, an elastic part 193 extending from the securing part 191, and a resisting part 195 extending from the elastic part 193. The securing part 191 defines two securing holes 1911 corresponding to the two securing portions 17. The elastic part 193 is V-shaped. The resisting part 195 defines a positioning opening 1951 corresponding to the positioning portion 153.

Figure 4:
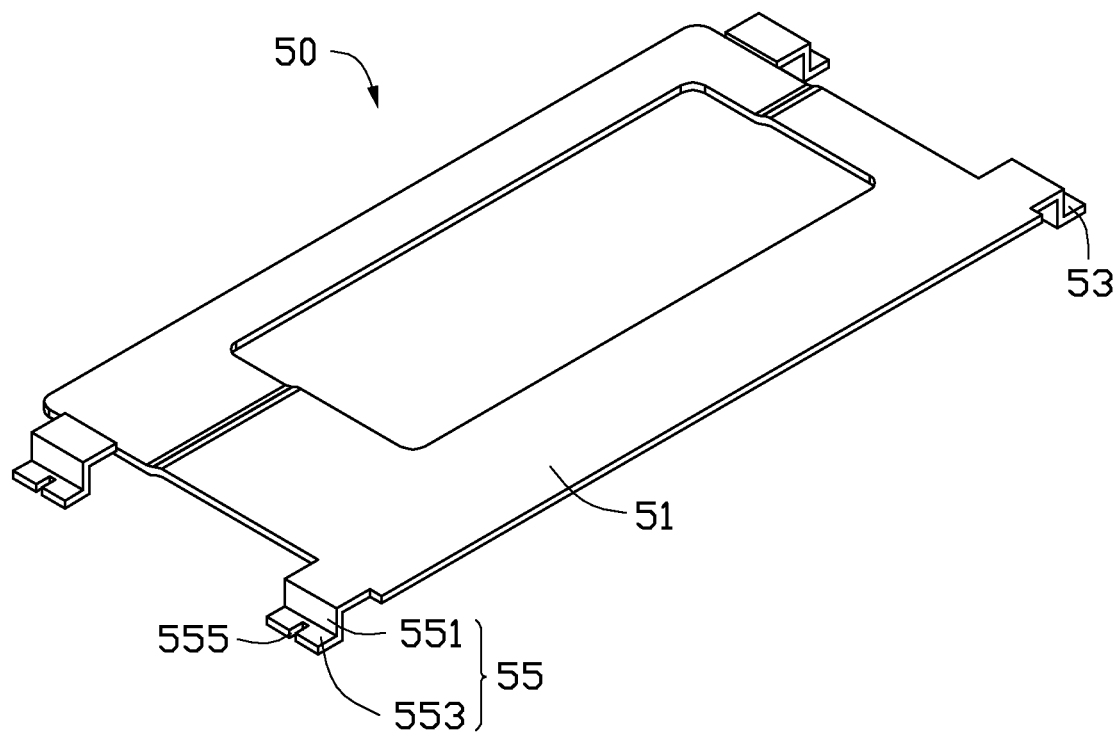
FIG. 4 is an isometric view of the securing panel of FIG. 1.

FIG. 4 shows that the securing panel 50 includes a panel body 51 substantially parallel to the enclosure body 11, two first resisting tabs 53, and two second resisting tabs 55. The first and second resisting tabs 53 and 55 extend from the panel body 51. The first resisting tabs 53 and the second resisting tabs 55 are L-shaped. The second resisting tabs 55 include first extending portions 551 and second extending portions 553 extending substantially perpendicularly from the first extending portions 551. Each second extending portion 553 defines a cutout 555. The first extending portions 551 extend substantially perpendicularly from the panel body 51.

Figure 5:
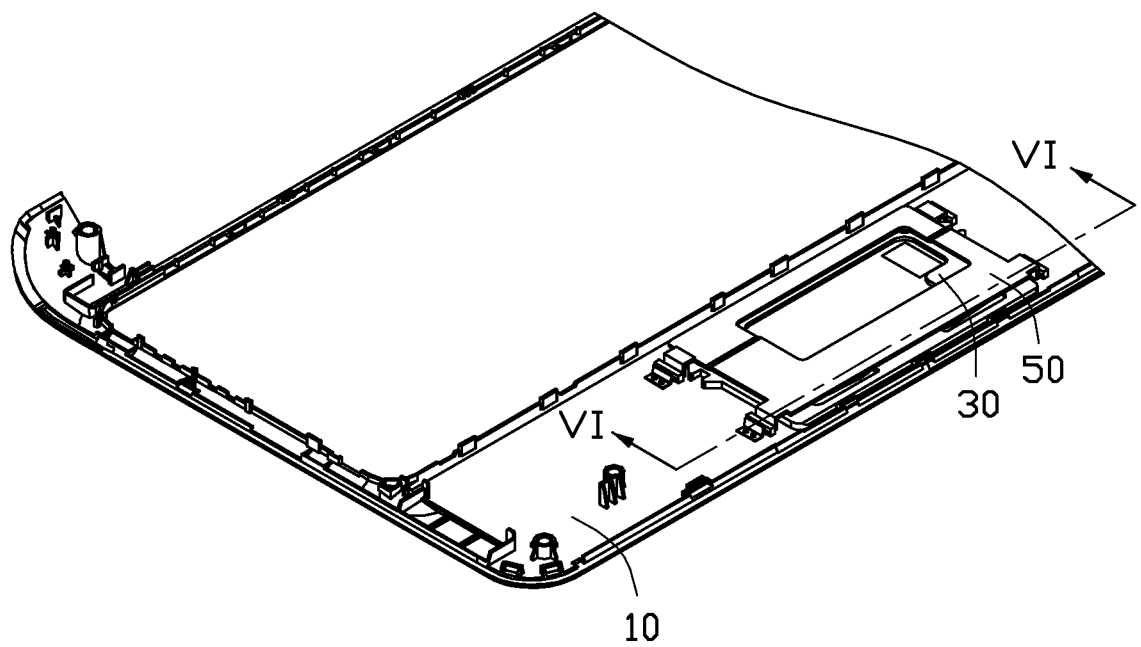
FIG. 5 is an assembled view of FIG. 1.
Figure 6:
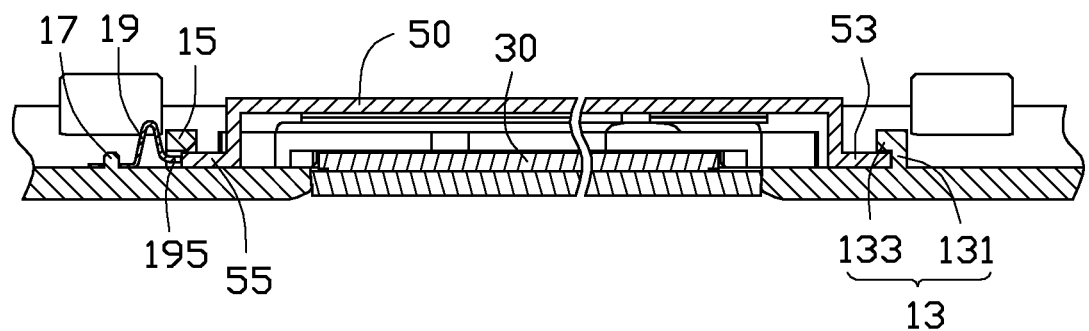
FIG. 6 is a cross-sectional view of FIG. 5 taken along a line VI-VI of FIG. 5.

FIGS. 5 and 6 show that in assembly, the securing holes 1911 of the two elastic elements 19 receive the securing portions 17, the resisting parts 195 are received in the corresponding through holes 151 of the second resisting portions 15, and the positioning portion 153 of each second resisting portion 15 is received in the corresponding positioning openings 1951. The touch panel 30 is placed in the mounting opening 111, and the securing panel 50 is placed on the touch panel 30. The two second resisting tabs 55 of the securing panel 50 are passed through the through holes 151 of the second resisting portions 15, such that the positioning portions 153 are received in the cutouts 555 of the second resisting tabs 55. The two second resisting tabs 55 abut against the resisting parts 195 of the two elastic elements 19. The elastic elements 19 are pressed to enable the first resisting tabs 53 to be positioned between the first resisting portions 13 and the enclosure body 11. After that, the elastic elements 19 rebound to push the first resisting tabs 53 to abut against the first parts 131 of the first resisting portions 13 and be received between the second parts 133 and the enclosure body 11. Thus, the touch panel 30 is secured between the panel body 51 of the securing panel 50 and the enclosure body 11.

Figure 7:
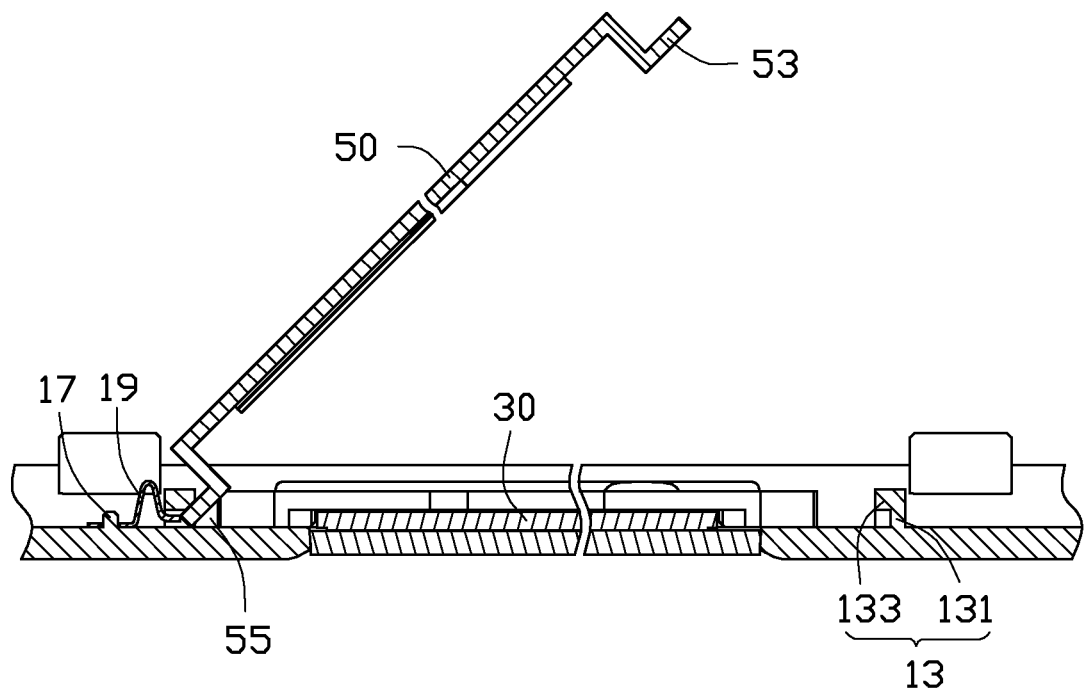
FIG. 7 is similar to FIG. 6, the securing panel removed from the enclosure.

FIG. 7 shows that in disassembly, the securing panel 50 is moved toward the elastic elements 19 until the first resisting tabs 53 move out of the first resisting portions 13, allowing the securing panel 50 to be easily dismounted from the enclosure 10.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A pointing device, comprising:
   an enclosure, the enclosure comprises an enclosure body, a first resisting portion and a second resisting portion extending from the enclosure body, and an elastic element mounted to the enclosure body;
   a touch panel, the touch panel is placed between the first resisting portion and the second resisting portion; and
   a securing panel, the securing panel comprises a panel body, and a first resisting tab and a second resisting tab extending from the panel body; the first resisting tab is received in the first resisting portion and the second resisting tab is received in the second resisting portion, thereby enabling the touch panel to be secured between the panel body and the enclosure body;

wherein the elastic element resists the second resisting portion; the elastic element is configured to drive the securing panel to move and enable the first resisting tab to move into the first resisting portion.

2. The pointing device of claim 1, wherein the second resisting portion defines a through hole, and the second resisting tab and the elastic element are received in the through hole.

3. The pointing device of claim 2, wherein the elastic element comprises an elastic part and a resisting part extending from the elastic part, and the resisting part is received in the through hole.

4. The pointing device of claim 3, wherein the elastic element further comprises a securing part extending from the elastic part; the securing part defines a securing hole; the enclosure further comprises a securing portion extending from the enclosure body; and the securing portion is received in the securing hole to secure the elastic element to the enclosure body.

5. The pointing device of claim 3, wherein the elastic part is V-shaped.

6. The pointing device of claim 1, wherein the second resisting portion defines two through holes and comprises a positioning portion located between the two through holes; the second resisting tab defines a cutout; and the second resisting tab is located in the two through holes to enable the positioning portion to be received in the cutout.

7. The pointing device of claim 6, wherein the elastic element defines a positioning opening and the positioning portion is received in the positioning opening.

8. The pointing device of claim 1, wherein the first resisting portion comprises a first part extending from the enclosure body and a second part extending from the first part; and the first resisting tab is received between the enclosure body and the second part.

9. The pointing device of claim 8, wherein the first part is substantially perpendicular to the second part.

10. The pointing device of claim 1, wherein the enclosure body defines a mounting opening the touch panel.

11. A pointing device, comprising:
an enclosure, the enclosure comprise an enclosure body, a first resisting portion and a second resisting portion extending from the enclosure body, and an elastic element;
a touch panel, the touch panel is placed between the first resisting portion and the second resisting portion; and
a securing panel, the securing panel is received between the first resisting portion and the second resisting portion and is prevented from moving along a direction substantially perpendicular to the enclosure body;
wherein the elastic element is received in the first resisting portion; the elastic element resists the securing panel to prevent the securing panel from moving in a direction substantially parallel to the enclosure body to move out of the second resisting portion.

12. The pointing device of claim 11, wherein the securing panel comprises a panel body, and a first resisting tab and a second resisting tab extending from the panel body; and the first resisting tab is received in the first resisting portion and the second resisting tab is received in the second resisting portion, thereby enabling the touch panel to be secured between the panel body and the enclosure body.

13. The pointing device of claim 12, wherein the second resisting portion defines a through hole, and the second resisting tab and the elastic element are received in the through hole.

14. The pointing device of claim 13, wherein the elastic element comprises an elastic part and a resisting part extending from the elastic part, and the resisting part is received in the through hole.

15. The pointing device of claim 14, wherein the elastic element further comprises a securing part extending from the elastic part; the securing part defines a securing hole; the enclosure further comprises a securing portion extending from the enclosure body; the securing portion is received in the securing hole to secure the elastic element to the enclosure body.

16. The pointing device of claim 14, wherein the elastic part is V-shaped.

17. The pointing device of claim 12, wherein the second resisting portion defines two through holes and comprises a positioning portion located between the two through holes; the second resisting tab defines a cutout; and the second resisting tab is located in the two through holes to enable the positioning portion to be received in the cutout.

18. The pointing device of claim 17, wherein the elastic element defines a positioning opening and the positioning portion is received in the positioning opening.

19. The pointing device of claim 12, wherein the first resisting portion comprises a first part extending from the enclosure body and a second part extending from the first part; and the first resisting tab is received between the enclosure body and the second part.

20. The pointing device of claim 19, wherein the first part is substantially perpendicular to the second part.

* * * * *